US008849564B2

(12) United States Patent
Mutoh

(10) Patent No.: US 8,849,564 B2
(45) Date of Patent: Sep. 30, 2014

(54) ROUTE COMPARISON DEVICE, ROUTE COMPARISON METHOD, AND PROGRAM

(75) Inventor: Yasuo Mutoh, Tokyo (JP)

(73) Assignee: Sony Corporation, Tokyo (JP)

( * ) Notice: Subject to any disclaimer, the term of this patent is extended or adjusted under 35 U.S.C. 154(b) by 104 days.

(21) Appl. No.: 13/489,676

(22) Filed: Jun. 6, 2012

(65) Prior Publication Data

US 2012/0323483 A1 Dec. 20, 2012

(30) Foreign Application Priority Data

Jun. 20, 2011 (JP) ................. 2011-136511

(51) Int. Cl.
*G01C 21/12* (2006.01)
*G01C 21/34* (2006.01)
*G09B 29/10* (2006.01)
*G01C 21/00* (2006.01)

(52) U.S. Cl.
CPC ............ *G01C 21/34* (2013.01); *G01C 21/3469* (2013.01); *G09B 29/106* (2013.01); *G01C 21/00* (2013.01)
USPC ...................................... 701/410

(58) Field of Classification Search
CPC .... G01C 21/00; G01C 21/3469; G01C 21/34; G09B 29/106
USPC ........................................ 701/410
See application file for complete search history.

(56) References Cited

U.S. PATENT DOCUMENTS

| 6,636,802 B1* | 10/2003 | Nakano et al. ................. 701/532 |
| 7,149,533 B2* | 12/2006 | Laird et al. ................. 455/456.3 |
| 7,221,928 B2* | 5/2007 | Laird et al. ................. 455/404.1 |
| 2004/0204843 A1* | 10/2004 | Hayama et al. ............... 701/209 |
| 2006/0106534 A1* | 5/2006 | Kawamata et al. ........... 701/208 |
| 2007/0010941 A1* | 1/2007 | Marsh .......................... 701/209 |
| 2008/0033633 A1* | 2/2008 | Akiyoshi et al. ............. 701/201 |
| 2009/0030600 A1* | 1/2009 | Liu .............................. 701/201 |

FOREIGN PATENT DOCUMENTS

| JP | 2005-337744 | 12/2005 |
| JP | 2011-2445 | 1/2011 |

* cited by examiner

*Primary Examiner* — Behrang Badii
*Assistant Examiner* — Daniel L Greene
(74) *Attorney, Agent, or Firm* — Oblon, Spivak, McClelland, Maier & Neustadt, L.L.P.

(57) ABSTRACT

A device, system and method of embodiments of the invention include a route comparison device having circuitry configured to acquire location information of a starting point and a goal point, acquire shape data of a reference route between the starting point and the goal point, search for a route between the starting point and the goal point, and calculate, by comparing shape data of a found route which has been found and the shape data of the reference route, a degree of matching indicating a degree of correspondence between the routes.

16 Claims, 15 Drawing Sheets

FIG. 15
| POINT INFORMATION | SHAPE DATA | COUNT |
|---|---|---|
| (35.658517 , 139.701334) — (35.690921, 139.700258) | 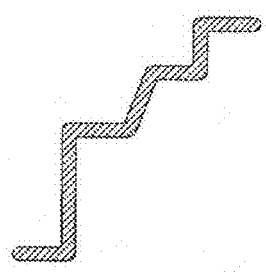 | 115 |
| (35.658517 , 139.701334) — (35.690921, 139.700258) | 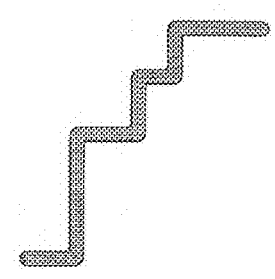 | 22 |
| (35.658517 , 139.701334) — (35.690921, 139.700258) | 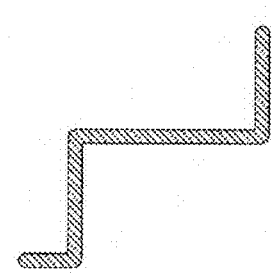 | 5 |
| ... | ... | ... |

ROUTE COMPARISON DEVICE, ROUTE COMPARISON METHOD, AND PROGRAM

BACKGROUND

The present disclosure relates to a route comparison device, a route comparison method, and a program.

In many cases, there are a plurality of routes from one spot to a destination. The optimal route for a user, among these routes, is different depending on the preference or the demand of the user, for example. Also, the optimal route for the user is also different depending on the state of each route at the time. Thus, algorithms for searching for a route are evolving, taking these elements into consideration.

Now, a road included in road map information is formed by connecting, by a link (a straight line), nodes expressed, for example, by a combination of a latitude and a longitude. For example, JP 2005-337744A discloses comparison of a route indicated by route information and a route included in road map information based on comparison of nodes included in the route information and nodes included in the road map information. Also, JP 2011-002445A discloses comparison of a route which is a search result and a route included in map data based on comparison of a link number (a number used for identification assigned to a link) included in the route search result and a link number included in the map data.

SUMMARY

However, the data structure or the storage method of route information may be different depending on the map format or hardware. Therefore, when map formats or hardware are different, accurate comparison of routes is sometimes not possible.

Accordingly, the present disclosure proposes a route comparison device, a route comparison method, and a program which are novel and improved, and which are capable of comparing routes and calculating the degree of matching even when data structures or storage methods of pieces of route information are different.

According to the present disclosure, there is provided a route comparison device which includes a point information acquisition unit for acquiring location information of a starting point and a goal point, a reference route acquisition unit for acquiring shape data of a reference route between the starting point and the goal point, a route search unit for searching for a route between the starting point and the goal point, and a degree-of-matching calculation unit for calculating, by comparing shape data of a found route which has been found by the route search unit and the shape data of the reference route, a degree of matching indicating a degree of correspondence between the routes.

According to such a configuration, a degree of matching indicating a degree of correspondence between routes can be calculated based on shape data of the routes. In the case of calculating the degree of correspondence between routes by determining whether links forming the routes match corresponding links, if the data structures or storage methods of pieces of route information differ, it is difficult to perform accurate comparison. However, according to the above configuration, since routes are compared based on the shape data of the routes, routes regarding which the data structures of route information or the storage methods differ due to the difference in the map format or the hardware that generates route information can be compared.

According to another embodiment of the present technology, there is provided a route comparison device which includes a point information acquisition unit for acquiring location information of a starting point and a goal point, a route acquisition unit for acquiring shape data of two routes between the starting point and the goal point, and a degree-of-matching calculation unit for calculating, by comparing the shape data of the two routes acquired by the route acquisition unit, a degree of matching indicating a degree of correspondence between the two routes.

According to another embodiment of the present technology, there is provided a route comparison method which includes acquiring location information of a starting point and a goal point, acquiring shape data of a reference route between the starting point and the goal point, searching for a route between the starting point and the goal point, and calculating, by comparing shape data of a found route which has been found and the shape data of the reference route, a degree of matching indicating a degree of correspondence between the routes.

According to another embodiment of the present technology, there is provided a program for causing a computer to function as a route comparison device including a point information acquisition unit for acquiring location information of a starting point and a goal point, a reference route acquisition unit for acquiring shape data of a reference route between the starting point and the goal point, a route search unit for searching for a route between the starting point and the goal point, and a degree-of-matching calculation unit for calculating, by comparing shape data of a found route which has been found by the route search unit and the shape data of the reference route, a degree of matching indicating a degree of correspondence between the routes.

As described above, according to the present disclosure, routes can be compared and the degree of matching can be calculated even when data structures or storage methods of pieces of route information are different.

BRIEF DESCRIPTION OF THE DRAWINGS

FIG. 15 is an explanatory diagram showing an example of sorted data used in the embodiment.

DETAILED DESCRIPTION OF THE EMBODIMENT(S)

Figure 1:
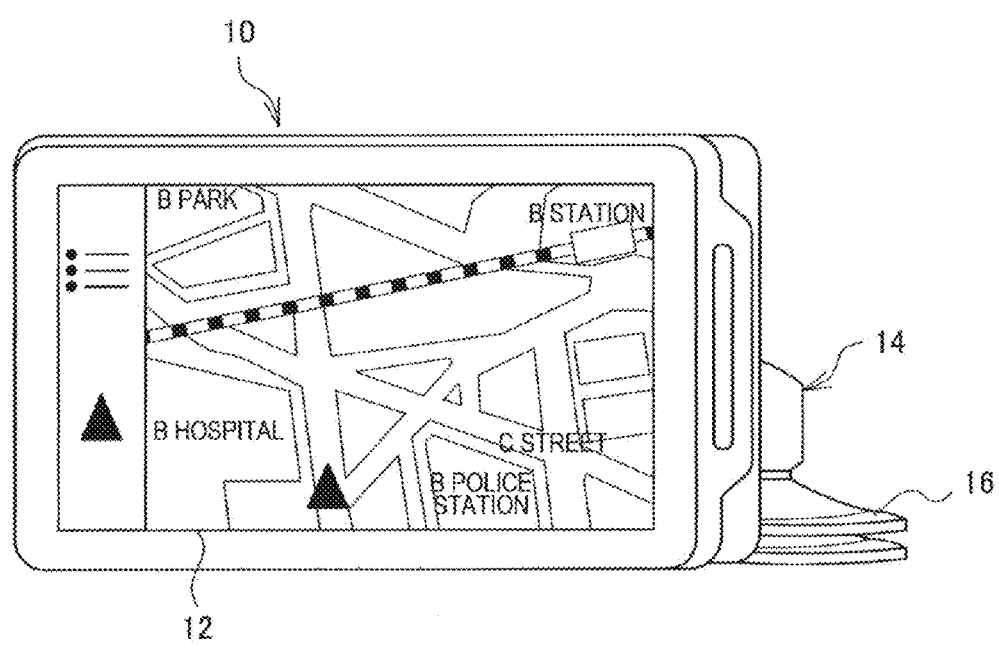
FIG. 1 is an external diagram of a route comparison device (a PND) according to a first embodiment of the present disclosure.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

Also, the explanation will be given in the following order.
1. First Embodiment (Example of PND-based Route Comparison Device)
  1-1. Configuration
  1-2. Example Operation
2. Second Embodiment (Example of Mobile Phone-based Route Comparison Device)
  2-1. Configuration
3. Third Embodiment (Example Application of Route Comparison Device to Reference Route Generation Device)
  3-1. Overview
  3-2. Configuration

1. First Embodiment (1-1. Configuration)

Figure 2:
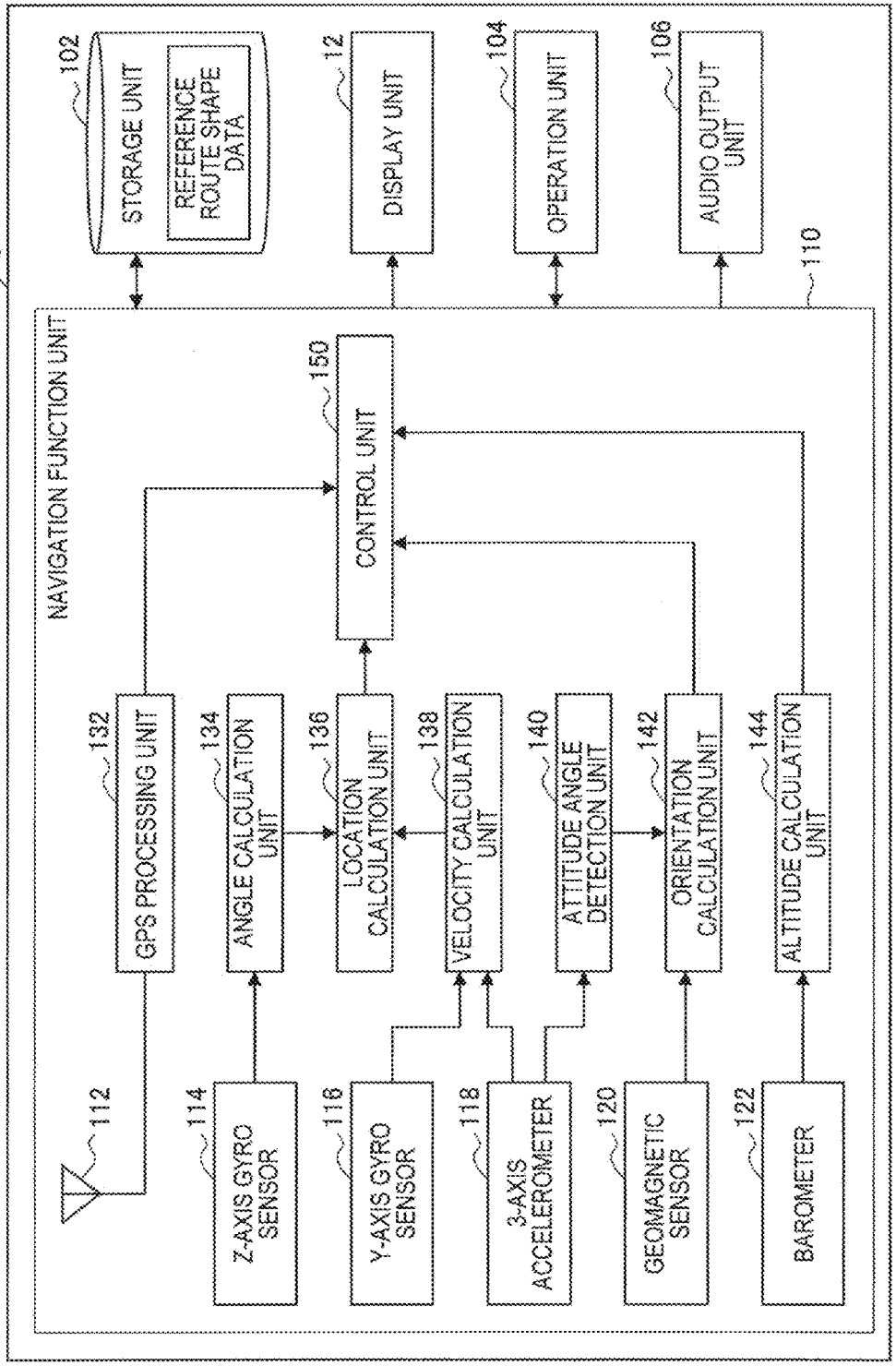
FIG. 2 is a functional block diagram of the route comparison device according to the embodiment.
Figure 3:
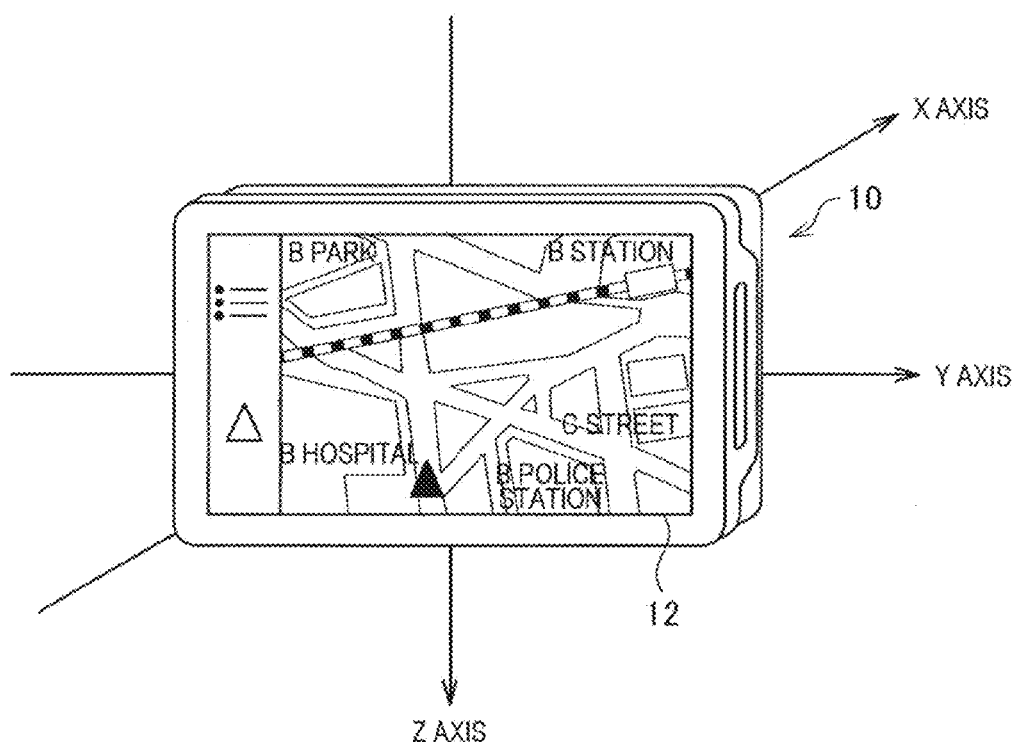
FIG. 3 is an explanatory diagram showing a coordinate system of the route comparison device according to the embodiment.
Figure 4:
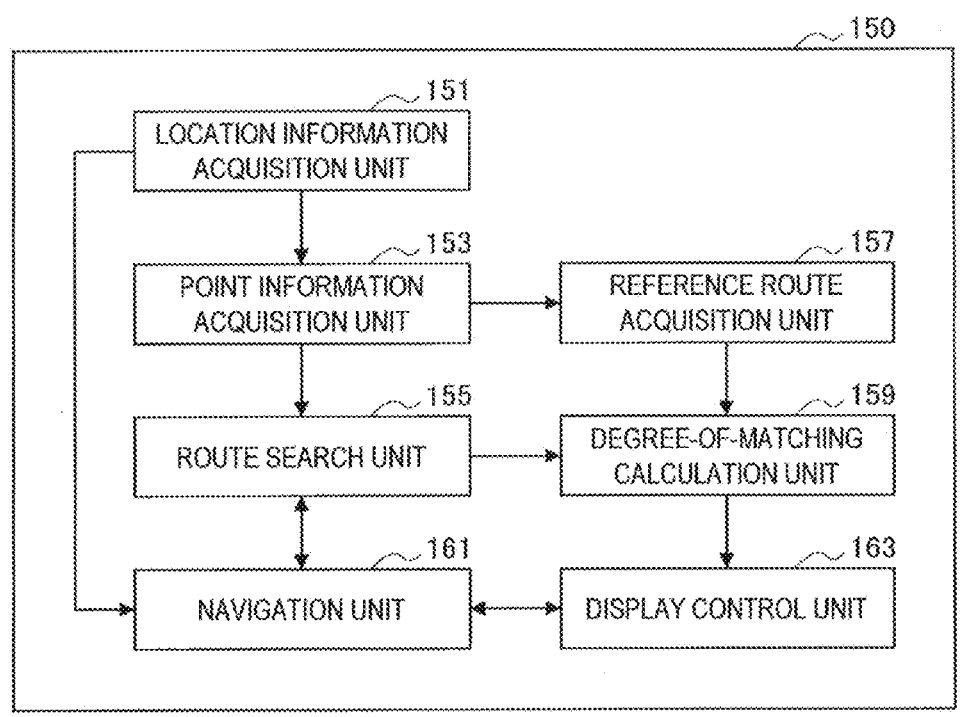
FIG. 4 is a block diagram showing a detailed configuration of a control unit of the route comparison device according to the embodiment.
Figure 5:
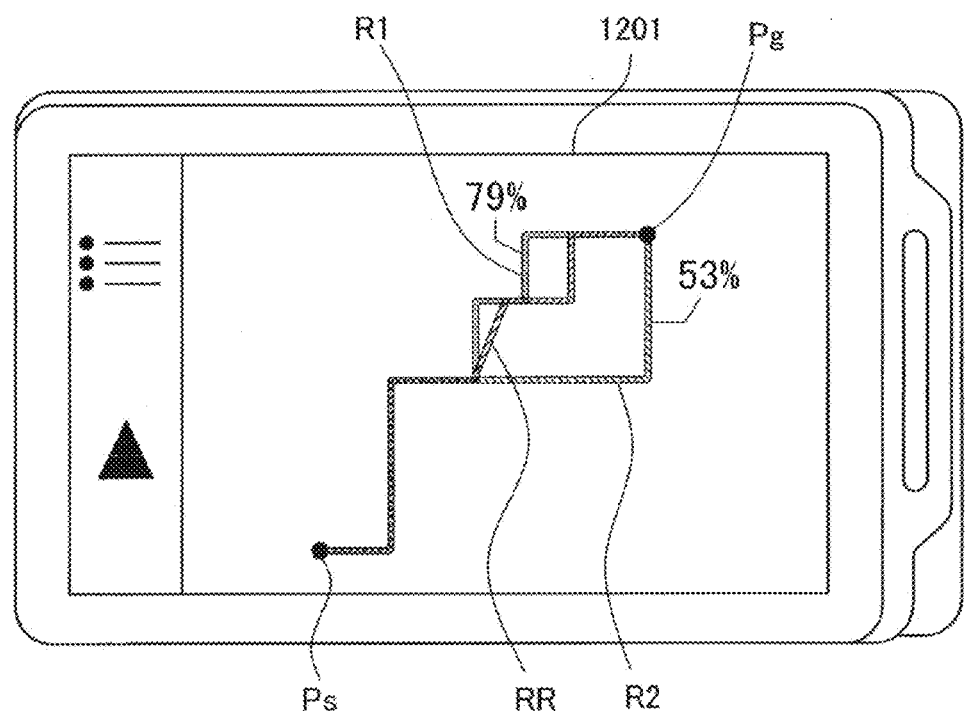
FIG. 5 is an explanatory diagram showing an example of a display screen of the route comparison device according to the embodiment

First, a configuration of a PND (Personal Navigation Device), which is an example of a route comparison device according to a first embodiment of the present disclosure, will be described with reference to FIGS. 1 to 5. FIG. 1 is an external diagram of the route comparison device (the PND) according to the first embodiment of the present disclosure. FIG. 2 is a functional block diagram of the route comparison device according to the embodiment. FIG. 3 is an explanatory diagram showing a coordinate system of the route comparison device according to the embodiment. FIG. 4 is a block diagram showing a detailed configuration of a control unit of the route comparison device according to the embodiment. FIG. 5 is an explanatory diagram showing an example of a display screen of the route comparison device according to the embodiment.

Referring to FIG. 1, an example appearance of a PND 10, which is an example of the route comparison device according to the first embodiment of the present disclosure, is shown. The PND 10 has a navigation function of showing a route to a destination, and has a function of providing a user with various types of information that are associated with location information. The PND 10 includes, on its front surface, a display unit 12 for displaying an information provision screen that provides various types of information to a user, and its housing is held by a vehicle cradle 14 that is mounted on the dashboard of a vehicle by a suction cup 16. The PND 10 can be easily attached to and detached from the vehicle cradle 14. Accordingly, one PND 10 can be used with a plurality of vehicles. This PND 10 has a function of obtaining current location information of the PND 10, and also, stores map data. Therefore, the PND 10 can display on the display unit 12, information about the current location, the information being superimposed on a map.

Next, an example of a configuration of the PND 10 will be described with reference to FIG. 2. The PND 10 mainly includes a display unit 12, a storage unit 102, an operation unit 104, an audio output unit 106, and a navigation function unit 110.

The navigation function unit 110 mainly includes a GPS antenna 112, a Z-axis gyro sensor 114, a Y-axis gyro sensor 116, a 3-axis accelerometer 118, a geomagnetic sensor 120, a barometer 122, a GPS processing unit 132, an angle calculation unit 134, a location calculation unit 136, a velocity calculation unit 138, an attitude angle detection unit 140, an orientation calculation unit 142, an altitude calculation unit 144, and a control unit 150.

The display unit 12 is a display device for outputting a display screen for a user. For example, a display screen that is output here may be a screen where an icon or the like indicating the current location is superimposed on map data. This display unit 12 may be a display device such as a liquid crystal display (LCD), an organic electroluminescence (EL) display, or the like, for example.

The storage unit 102 is a storage medium storing a program for causing the PND 10 to operate, map data, shape data of a reference route (of which more later), and the like. This storage unit 102 may be, for example, a non-volatile memory, such as a flash ROM (or a flash memory), an electrically erasable programmable read-only memory (EEPROM), an erasable programmable ROM (EPROM) or the like, a magnetic disk, such as a hard disk, a discoid magnetic disk or the like, an optical disk, such as a compact disc (CD), a digital versatile disc recordable (DVD-R), a Blu-Ray disc (BD; registered trademark) or the like, or a magneto optical (MO) disk. Furthermore, the map data and the shape data of a reference route stored in the storage unit 102 may be stored in advance at the time of shipping of the PND 10. Also, the map data and the shape data of a reference route stored in the storage unit 102 may be acquired via a communication unit or a removable medium (not illustrated).

The operation unit 104 receives an operation input of a user, and outputs the details of the operation to the navigation function unit 110. As the operation input of a user, there may be cited setting of a destination, enlargement or reduction of a map, audio guide setting, screen display setting, and the like, for example. This operation unit 104 may be a touch screen that is integrally provided with the display unit 12. Or, the operation unit 104 may be a physical configuration that is provided separately from the display unit 12, such as a button, a switch, a lever or the like. Furthermore, the operation unit 104 may be a signal reception unit for detecting a signal, transmitted from a remote control, indicating an operation instruction of a user.

The audio output unit 106 is an output device for outputting audio data, and may be a speaker, for example. This audio output unit 106 outputs an audio guide regarding a lane to take, the direction of turning or the like, at the time of the navigation function unit showing a route to a destination, for example. By listening to the audio guide, a user can grasp the route to take, without looking at the display unit 12.

The GPS antenna 112 can receive GPS signals from a plurality of GPS satellites. The GPS antenna 112 inputs a received GPS signal to the GPS processing unit 132. Additionally, the GPS signal to be received here may include orbital data indicating the orbit of a GPS satellite and information such as a signal transmission time or the like.

The GPS processing unit 132 calculates location information indicating the current location of the PND 10 based on a plurality of GPS signals input from the GPS antenna 112. The GPS processing unit 132 supplies the calculated location information to the control unit 150. Specifically, the GPS processing unit 132 can calculate the location of each GPS satellite from orbital data that is obtained by demodulating each of the plurality of GPS signals, and calculate the distance between each GPS satellite and the PND 10 from the difference between the transmission time and the reception time of the GPS signal. Then, the GPS processing unit 132 can calculate the current three-dimensional location based on the location of each GPS and the distance between each GPS satellite and the PND 10 which have been calculated.

The navigation function unit 110 includes, in addition to an absolute location acquisition function by the GPS antenna 112 and the GPS processing unit 132 described above, a relative location acquisition function that uses various sensors. Information about a relative location may be used in a situation in which an absolute location is not acquired, such as when the PND 10 is at a location where it is covered overhead, such as inside a tunnel or in a forest, and a GPS signal is not received. Or, the information about a relative location may be used in combination with information about an absolute location.

The Z-axis gyro sensor 114 is a sensor that has a function of detecting, as a voltage value, a yaw rate $\omega_z$, which is the velocity (angular velocity) of change in the angle of rotation around a Z axis at the time of the PND 10 moving in a circle. The Z-axis gyro sensor 114 detects the yaw rate $\omega_z$ at a predetermined sampling frequency, and inputs data indicating the yaw rate $\omega_z$ detected to the angle calculation unit 134. Additionally, as shown in FIG. 3, the Z axis corresponds to the vertical direction. An X axis corresponds to the travelling direction of the PND 10, and a Y axis corresponds to the horizontal direction perpendicular to the X axis.

The angle calculation unit 134 calculates an angle $\theta$ at the time of the PND 10 moving in a circle, by adding the sampling frequency to the yaw rate $\omega_z$ input from the Z-axis gyro sensor 114, and inputs angle data indicating the angle $\theta$ to the location calculation unit 136.

The Y-axis gyro sensor 116 is a sensor that has a function of detecting, as a voltage value, a pitch rate $\omega_y$, which is the angular velocity around the Y axis. The Y-axis gyro sensor 116 detects the pitch rate $\omega_y$ at a predetermined sampling frequency, and inputs data indicating the pitch rate $\omega_y$ detected to the velocity calculation unit 138.

The 3-axis accelerometer 118 is a sensor that has a function of detecting, as voltage values, acceleration $\alpha_x$ along the X axis, acceleration $\alpha_y$ along the Y axis, and acceleration $\alpha_z$ along the Z axis. The 3-axis accelerometer 118 detects the acceleration $\alpha_x$, the acceleration $\alpha_y$, and the acceleration $\alpha_z$ at a predetermined sampling frequency, and inputs pieces of data indicating the acceleration detected to the velocity calculation unit 138 and the attitude angle detection unit 140.

The velocity calculation unit 138 calculates a velocity V with respect to a travelling direction by dividing the acceleration $\alpha_z$ along the Z axis input from the 3-axis accelerometer 118 by the pitch rate $\omega_y$ input from the Y-axis gyro sensor 116, and inputs the velocity V calculated to the location calculation unit 136.

The location calculation unit 136 has a function of calculating location information of the current location based on the velocity V calculated by the velocity calculation unit 138 and the angle $\theta$ calculated by the angle calculation unit 134. Specifically, the location calculation unit 136 obtains an amount of change from a location of previous calculation to the current location, based on the velocity V and the angle $\theta$. Then, the location calculation unit 136 supplies this amount of change to the control unit 150.

The attitude angle detection unit 140 first performs a predetermined attitude angle detection process based on the acceleration data $\alpha_x$, $\alpha_y$, and $\alpha_z$ input from the 3-axis accelerometer 118, and thereby generates attitude angle data indicating the attitude angle of the PND 10 and inputs the same to the orientation calculation unit 142.

The geomagnetic sensor 120 is a sensor for detecting, as voltage values, geomagnetism $M_x$, $M_y$, and $M_z$ of an X-axis direction, a Y-axis direction, and a Z-axis direction, respectively. The geomagnetic sensor 120 inputs the geomagnetism $M_x$, $M_y$, and $M_z$ detected to the orientation calculation unit 142.

The orientation calculation unit 142 performs a predetermined correction process on the geomagnetism $M_x$, $M_y$, and $M_z$ input from the geomagnetic sensor 120, and generates orientation data indicating an orientation of the PND 10 based on the corrected geomagnetic data and the attitude angle data input from the attitude angle detection unit 140. The orientation calculation unit 142 supplies the orientation data generated to the control unit 150.

That is, the geomagnetic sensor 120, the 3-axis accelerometer 118, the attitude angle detection unit 140, and the orientation calculation unit 142 function as a so-called electronic compass, and generate the orientation data. The control unit 150 uses this orientation data mainly when the PND 10 is used while removed from the cradle 14 (such as when it is used during walking, for example), and can provide map data displayed in accordance with the direction of the PND 10 to a user. Additionally, when operating in a vehicle-mounted mode, the PND 10 correlates travelling history and a road in map data, and can provide a user with map data that is brought into accordance with the direction of the PND 10 based on the orientation of the map. Alternatively, the PND 10 can calculate the direction of the PND 10 from acquired GPS orientation and provide map data that is in accordance with the direction.

The barometer 122 is a sensor that has a function of detecting peripheral atmospheric pressure as a voltage value. The barometer 122 detects atmospheric pressure at a predetermined sampling frequency, and inputs the atmospheric pressure data detected to the altitude calculation unit 144.

The altitude calculation unit 144 calculates the altitude of the PND 10 based on the atmospheric pressure input from the barometer 122, and supplies the altitude data calculated to the control unit 150.

The control unit 150 has a function of controlling operation of the entire PND 10. For example, as shown in FIG. 4, the control unit 150 mainly includes a location information acquisition unit 151, a point information acquisition unit 153, a route search unit 155, a reference route acquisition unit 157, a degree-of-matching calculation unit 159, a navigation unit 161, and a display control unit 163.

The location information acquisition unit 151 has a function of acquiring location information of the current location of the PND 10. The location information acquisition unit 151 can acquire information about an absolute location supplied from the GPS processing unit 132, for example. Also, the location information acquisition unit 151 can acquire an amount of change from the previously calculated location to the current location supplied from the location calculation unit 136, and calculate location information by autonomous navigation. Furthermore, the location information acquisition unit 151 can also acquire the orientation of the PND 10 supplied from the orientation calculation unit 142. Furthermore, the location information acquisition unit 151 can also acquire the altitude data of the PND 10 supplied from the altitude calculation unit 144. The location information acquisition unit 151 can acquire the current location information of the PND 10 by selecting from various types of information acquired or by combining various types of information acquired.

Furthermore, when the PND 10 is operating in a vehicle-mounted mode, the location information acquisition unit 151 can specify the road it is taking by a map matching process that is based on the current location information acquired and road network data included in map data, and correct the location information to be a location on the road. Furthermore, the location information acquisition unit 151 may acquire accurate location information by performing any other location information correction process.

The point information acquisition unit 153 has a function of acquiring location information of a starting point and a goal point. For example, when a user performed a destination setting operation, the point information acquisition unit 153 may take the current location information acquired by the location information acquisition unit 151 as the location information of the starting point and the location information of a destination which has been set as the location information of the goal point. Alternatively, the point information acquisition unit 153 may acquire the location information of the starting point and the goal point based on the setting operation of the user. For example, the point information acquisition unit 153 may take a registered point selected by the user from registered points which have been registered in advance as the starting point or the goal point. Also, the point information acquisition unit 153 may take as the starting point or the goal point a desired point found using a search method such as an address search, a phone number search, a keyword search, a genre search or the like.

The route search unit 155 has a function of searching for a route from a starting point to a goal point based on the location information of the starting point and the location information of the goal point acquired by the point information acquisition unit 153. In the following, a route found by the route search unit 155 is sometimes referred to as a found route. Additionally, the route search unit 155 may also be able to search for a suitable route according to the operation mode of the PND 10. This operation mode may include the vehicle-mounted mode, a walking mode, and a bicycle mode, for example. For example, the operation mode may be switched according to a user operation, or it may automatically switch to the walking mode when removal from the cradle 14 is detected. For example, when the PND 10 is operating in the vehicle-mounted mode, the route search unit 155 may search among routes including expressways. Also, when the PND 10 is operating in the vehicle-mounted mode, the route search unit 155 may search for a route, avoiding a section where traffic congestion is expected, by using congestion prediction. Or, when the PND 10 is operating in the walking mode, the route search unit 155 may search for a route suitable for walking, such as a pedestrian subway, a station concourse, a pedestrian bridge, a park or the like, by using map data for walking different from map data for vehicles. Also, when the PND 10 is operating in the bicycle mode, the route search unit 155 may set a route that is suitable for bicycles. For example, when the PND 10 is operating in the bicycle mode, the route search unit 155 conducts a search, taking also into consideration roads that are too narrow to drive, and thus a route that is more suitable for bicycles can be found. Additionally, the route search unit 155 may also search for a plurality of routes from a starting point to a goal point using a plurality of different route search conditions.

The reference route acquisition unit 157 can acquire shape data of a reference route between a starting point and a goal point acquired by the point information acquisition unit 153. This reference route is preferably a "good route" for a user. Here, the "good route" can be defined in various ways. For example, if the good route is assumed to be a route selected by many users, the reference route is preferably a route generated based on data of a route that a plurality of users have actually selected. Or, the reference route may be generated based on a route found by a plurality of route search devices (that is, a plurality of route search algorithms). Also, the reference route may be a route reflecting preference information of each user. The reference route acquisition unit 157 may acquire the shape data of a reference route from the storage unit 102 within the PND 10, for example. Also, in the case the PND 10 includes an external connection interface such as a communication unit, the reference route acquisition unit 157 may acquire the shape data of a reference route from an external server or the like. With information of a reference route acquired here held as the shape data, it is highly possible that the amount of data is reduced compared to when holding information about a node and a link. The amount of data that can be reduced by holding the information of a reference route as the shape data is highly likely to increase as the distance between a starting point and a goal point increases. Although it will be described in detail later, this shape data is preferably held as an obscure shape with a broadened line width and a rounded joint between links to absorb errors between vendors or data formats of route search devices. The obscurer the shape becomes, more greatly the amount of data of the shape data can be reduced.

The degree-of-matching calculation unit 159 has a function of calculating a degree of matching indicating the degree of correspondence between two routes. At this time, the degree-of-matching calculation unit 159 can calculate the degree of matching by comparing the pieces of shape data of two routes, for example. Various methods can be conceived of as the method of comparison, but the degree-of-matching calculation unit 159 can calculate, as the degree of matching, the degree of correspondence between two routes by pattern matching, for example. At this time, the degree-of-matching calculation unit 159 may take the proportion of the area of the portion where the pieces of shape data of two routes overlap as the degree of matching. The shape data of a route can be formed by connecting a plurality of vectors. The degree-of-matching calculation unit 159 can improve the accuracy of matching by using shape data of a shape of a route which has been made obscure by broadening the line width of each vector. Also, the degree-of-matching calculation unit 159 may further obscure the shape of the route by performing a rounding process on joints between the vectors.

For example, the degree-of-matching calculation unit 159 can calculate the degree of matching between a found route found by the route search unit 155 and a reference route. At this time, if the shape data of the reference route is shape data after broadening of line width and rounding of joint, the degree-of-matching calculation unit 159 may use the found route after broadening the line width of the found route such that the line width is the same as the line width of the reference route. Or, if the shape data of the reference route is shape data on which broadening of line width and rounding of joint have not been performed, the degree-of-matching calculation unit 159 may calculate the degree of matching after broadening the line widths of the found route and the reference route and also performing the rounding process. Furthermore, in the case a plurality of found routes have been generated by the route search unit 155 searching for a plurality of routes, the degree-of-matching calculation unit 159 may calculate the degree of matching to the reference route for each of the plurality of found routes. When the degree of matching has been calculated for the plurality of found routes and these degrees of matching are displayed on a display screen, a user can select a route by referring to these degrees of matching.

The navigation unit 161 has a function of showing the path along the route selected. The navigation unit 161 can show the user the path by causing the display control unit 163 to display various display screens, for example. For example, the navigation unit 161 can show the path by displaying on the map, before the user reaches an intersection at which the user is to turn, an arrow indicating the direction of turning. Also, the navigation unit 161 can show the user the route by causing the audio output unit 106 to output audio. For example, selection of a route may be performed by causing the display control unit 163 to display a screen showing a map on which a route is superimposed and receiving selection of a route by the user.

The display control unit 163 has a function of generating a display screen and controlling display of the display unit 12. For example, the display control unit 163 may cause to be displayed a display screen showing a map on which the degree of matching calculated by the degree-of-matching calculation unit 159 is superimposed together with a found route. Also, the display control unit 163 may further superimpose a reference route on the map. When superimposing a reference route on the map, the display control unit 163 may cause to be displayed a starting point and a goal point of the shape data of the reference route that are matched with the starting point and the goal point on the map. Or, the display control unit 163 may specify, and display, a reference route by performing a map matching process based on the shape data of the reference route.

Here, an example of a display screen caused to be displayed by the display control unit 163 is shown in FIG. 5. This display screen 1201 is a screen that is displayed after a route between a starting point Ps and a goal point Pg has been found. The display screen 1201 includes the starting point Ps and the goal point Pg. Also, the display screen 1201 includes a reference route RR, a first found route R1, and a second found route R2 between the starting point Ps and the goal point Pg. Although simplified here, the reference route RR, the first found route R1, and the second found route R2 are actually superimposed on a map.

In the foregoing, examples of functions of the PND 10, which is an example of the route comparison device according to the present embodiment, have been given. Each of the structural elements described above may be configured using a general-purpose component or circuit, or may be configured by hardware dedicated to the function of each structural element. Also, the function of each structural element may be performed by an arithmetic device such as a CPU (Central Processing Unit) reading control program describing the processing procedure for realizing the function from a storage medium such as a ROM (Read Only Memory) or a RAM (Random Access Memory) storing the control program, and interpreting and executing the program. Accordingly, the configuration to be used can be changed as appropriate according to the technical level at the time of carrying out the present embodiment.

Additionally, a computer program for realizing each function of the PND 10 according to the present embodiment as described above can be created and installed on a personal computer or the like. Also, a computer-readable recording medium storing the computer program can be provided. The recording medium is, for example, a magnetic disk, an optical disk, a magneto-optical disk, a flash memory, or the like. Furthermore, the computer program described above may be delivered over a network without using the recording medium, for example.

(1-2. Example Operation)

Figure 6:
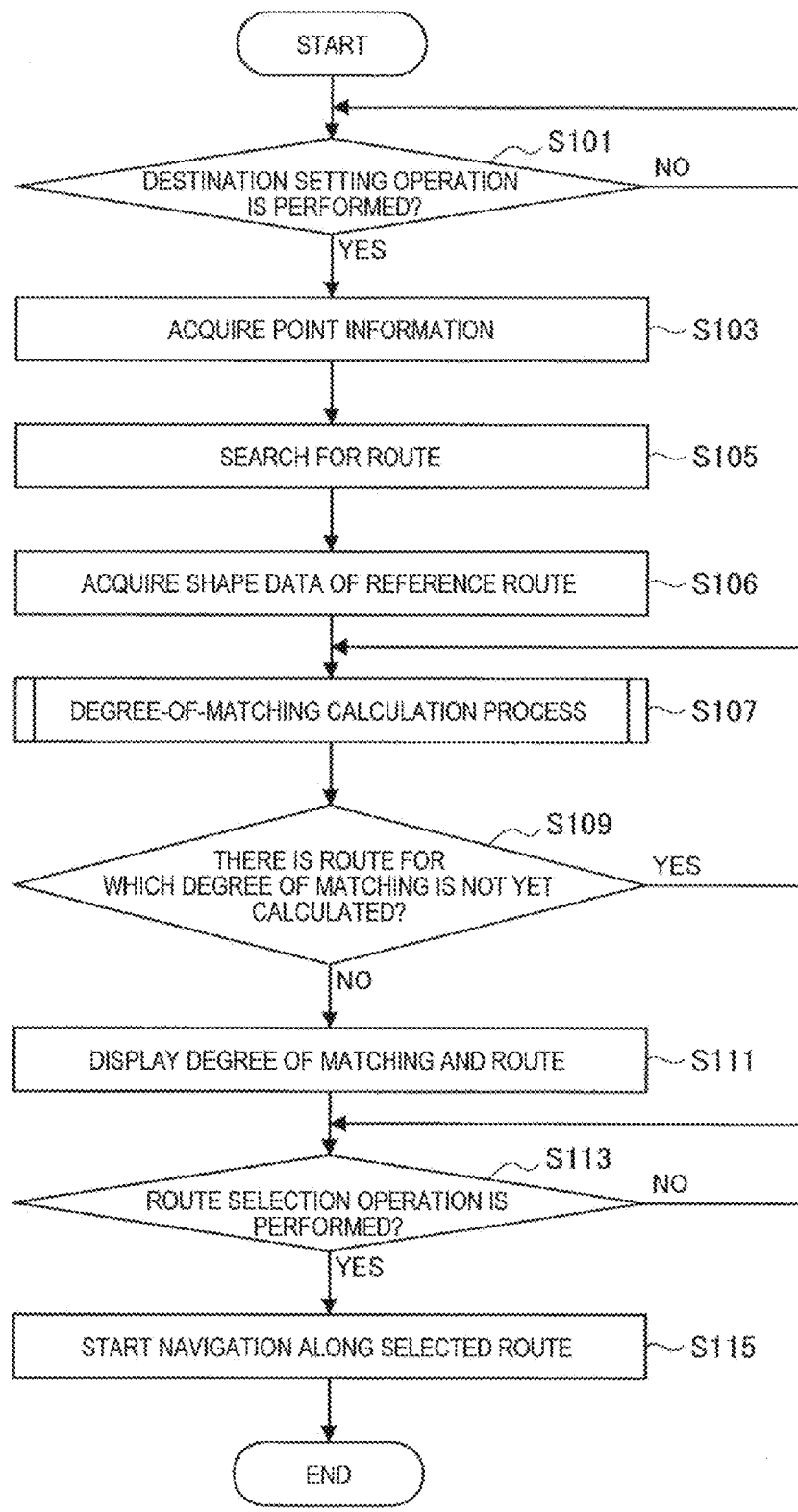
FIG. 6 is a flow chart showing an example of an operation of the route comparison device according to the embodiment.
Figure 7:
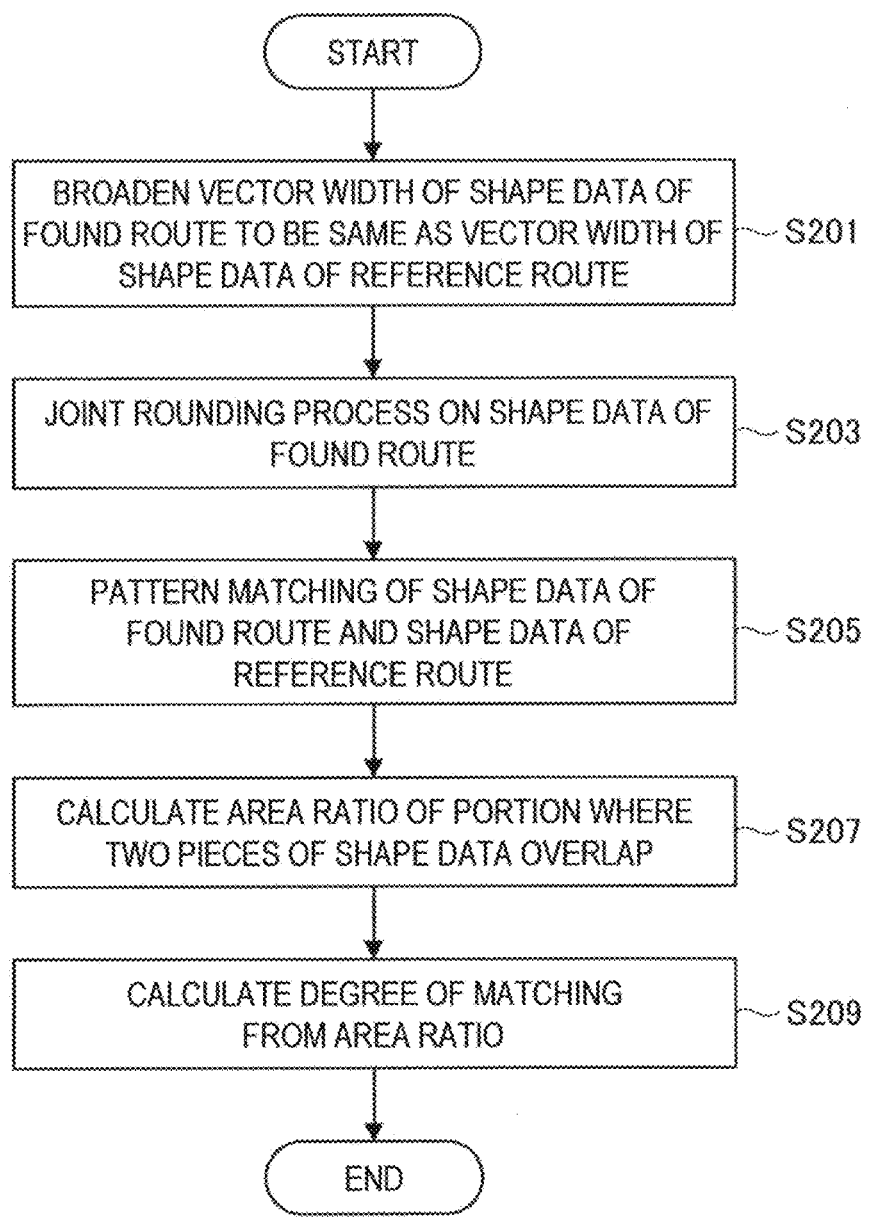
FIG. 7 is a flow chart showing an example of a degree-of-matching calculation process of the route comparison device according to the embodiment.
Figure 8:
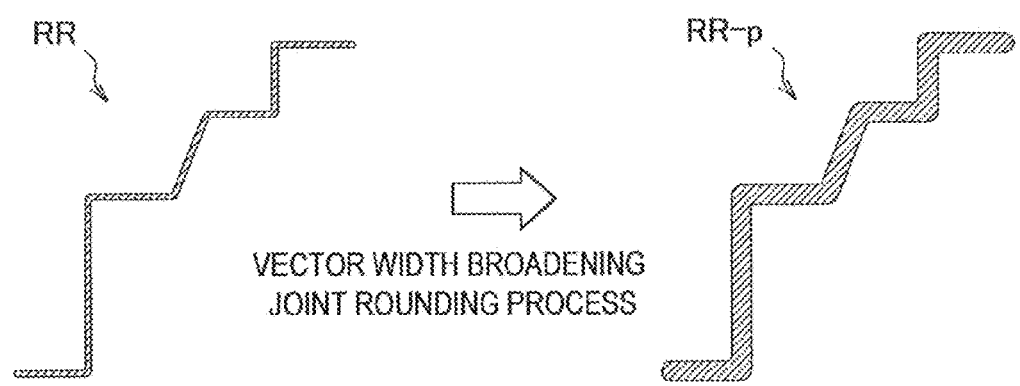
FIG. 8 is an explanatory diagram regarding a process of obscuring a reference route, according to the embodiment.
Figure 9:
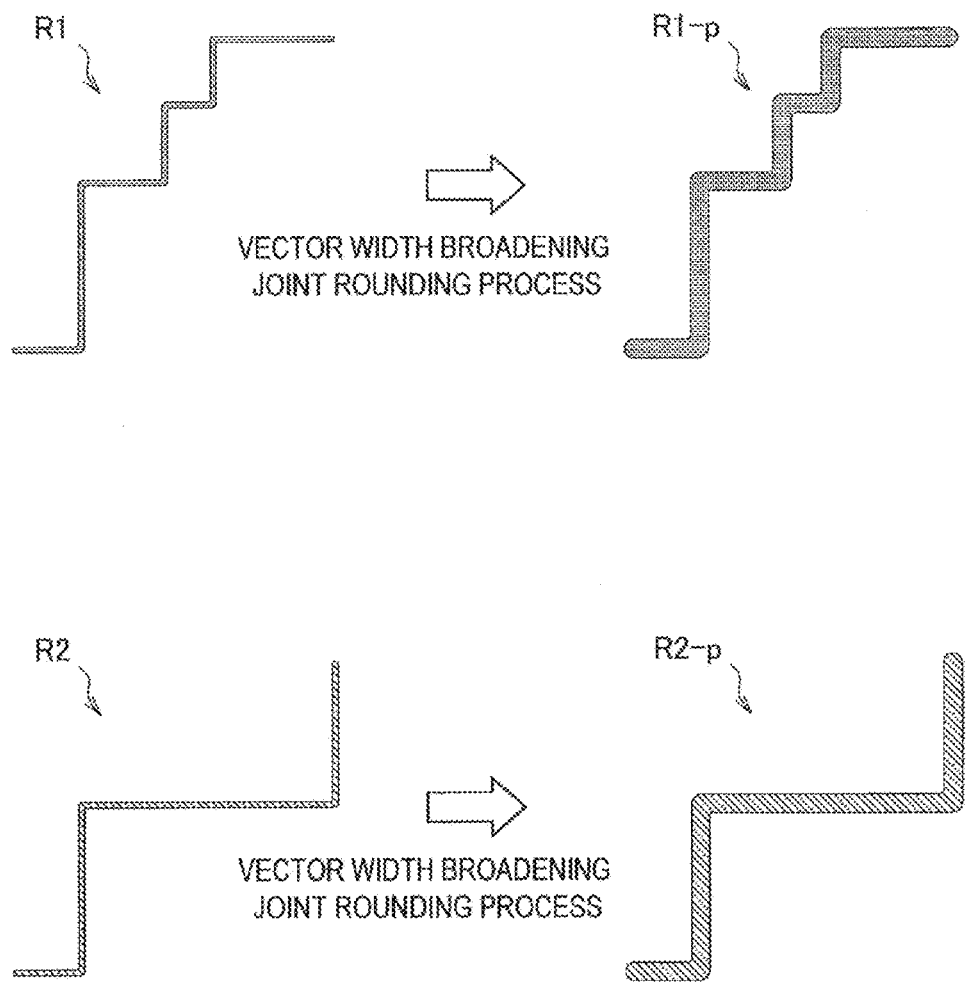
FIG. 9 is an explanatory diagram regarding a process of obscuring a found route, according to the embodiment.
Figure 10:
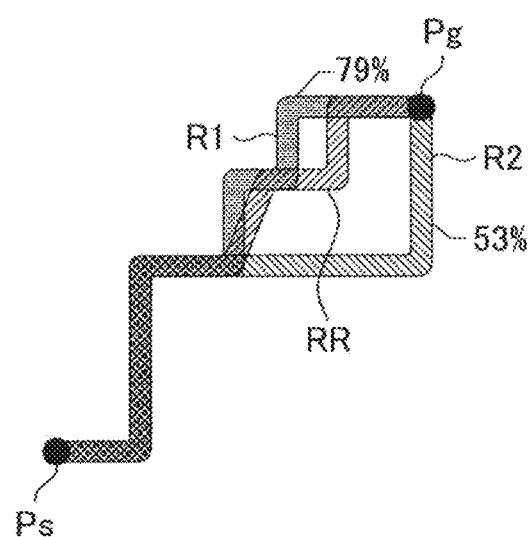
FIG. 10 is an explanatory diagram regarding the degree-of-matching calculation process according to the embodiment.

Next, an example operation of the PND 10, which is an example of the route comparison device according to the first embodiment of the present disclosure, will be described with reference to FIGS. 6 to 10. FIG. 6 is a flow chart showing an example of an operation of the route comparison device according to the embodiment. FIG. 7 is a flow chart showing an example of a degree-of-matching calculation process of the route comparison device according to the embodiment. FIG. 8 is an explanatory diagram regarding a process of obscuring a reference route, according to the embodiment. FIG. 9 is an explanatory diagram regarding a process of obscuring a found route, according to the embodiment. FIG. 10 is an explanatory diagram regarding the degree-of-matching calculation process according to the embodiment.

First, an example of an operation of the PND 10 according to the present embodiment will be described with reference to FIG. 6. First, the PND 10 determines whether there is a setting operation of a destination by a user (S101). Then, when it is determined that a setting operation of a destination is performed by the user, the point information acquisition unit 153 acquires location information of a starting point and a goal point (S103). At this time, the point information acquisition unit 153 may acquire location information of the current location from the location information acquisition unit 151 and take it as the location information of the starting point, and may acquire location information of the destination set in step S101 and take it as the location information of the goal point.

When the point information acquisition unit 153 acquires the location information of the starting point and the goal point, the route search unit 155 then searches for a route between the starting point and the goal point (S105). At this time, the route search unit 155 may search for a plurality of routes with same location information of the starting point and the goal point and with different search conditions. Then, the reference route acquisition unit 157 acquires a reference route between the starting point and the goal point acquired in step S103 (S106).

Then, the degree-of-matching calculation unit 159 performs the degree-of-matching calculation process on any of found routes (S107). Then, when the degree-of-matching calculation process is complete for a selected found path, the degree-of-matching calculation unit 159 determines whether there are routes for which the degree of matching is not yet calculated (S109). Then, in the case it is determined that there are routes for which the degree of matching is not yet calculated, the degree-of-matching calculation unit 159 selects any of the found routes for which the degree of matching is not calculated, and performs the degree-of-matching calculation process for the found route selected (S107).

Then, when it is determined in step S109 that the degree of matching has been calculated for all the found routes, the display control unit 163 can cause to be displayed the degrees of matching and the found routes (and the reference route) (S111). Whether a route selection operation is performed by the user on this display screen is next determined (S113). When it is determined in step S113 that the route selection operation is performed, the navigation unit 161 starts navigation along the selected route (S115).

Here, the details of the degree-of-matching calculation process in step S107 will be given with reference with FIGS.

7 to 10. Referring first to FIG. 7, the degree-of-matching calculation unit 159 broadens a vector width of shape data of the found routed found in step S105 to be the same as the vector width of shape data of the reference route acquired in step S106 (S201). Referring here to FIG. 8, a reference route RR is assumed to be held in the form of a reference route RR-p on which broadening of vector width and a rounding process of joint have been performed in advance. Then, the degree-of-matching calculation unit 159 performs the joint rounding process on the shape data of the found route (S203).

Pieces of shape data of the found route before and after the vector width broadening process of step S201 and the joint rounding process of step S203 are shown in FIG. 9. For example, if the vector width broadening process and the joint rounding process are performed on a found route R1, it will be as a found route R1-p. It is preferable that, when overlapping starting points and goal points of the found route R1-p and the reference route RR-p, the vector width of the found route R1-p and the vector width of the reference route RR-p are the same.

Referring back to FIG. 7, the degree-of-matching calculation unit 159 performs pattern matching of the shape data of the found route and the shape data of the reference route (S205). Then, the degree-of-matching calculation unit 159 calculates the ratio of the area of an overlapping portion of the two pieces of shape data, that is, the shape data of the found route and the shape data of the reference route, to the entire area (S207). Then, the degree of matching is calculated based on this area ratio (S209). For example, as shown in FIG. 10, when matching the positions of the starting points Ps and the goal points Pg, the ratio of an overlapping portion of the reference route RR and the found route R1 to the entire area of the shape data of the found route R1 is calculated to be 79%. On the other hand, when matching the positions of the starting points Ps and the goal points Pg, the ratio of an overlapping portion of the reference route RR and the found route R2 to the entire area of the shape data of the found route R2 is calculated to be 53%. For example, the degree-of-matching calculation unit 159 may take these ratios as the degrees of matching as they are.

2. Second Embodiment (2-1. Configuration)

Figure 11:
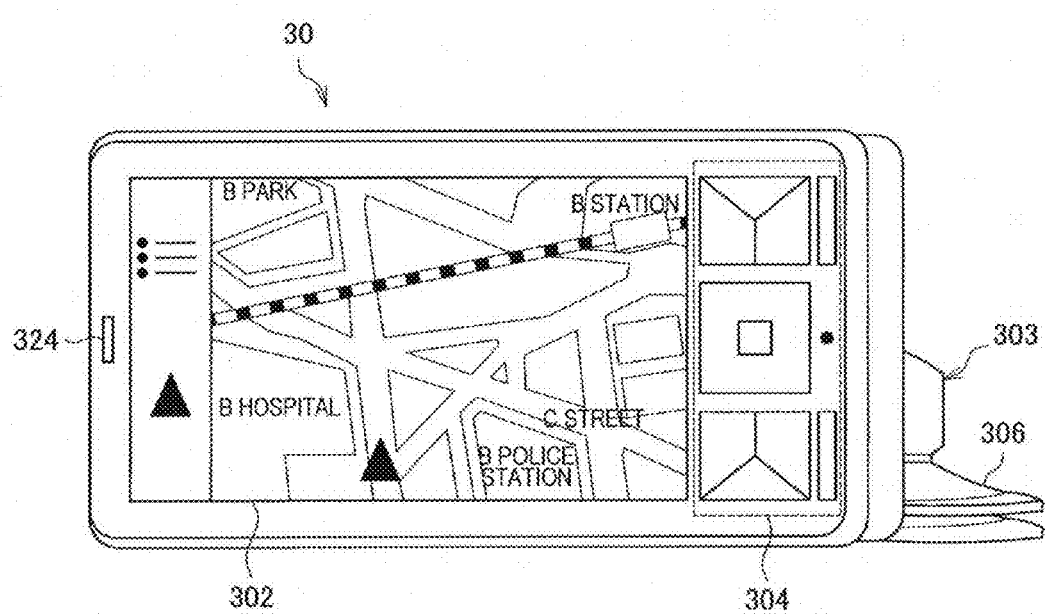
FIG. 11 is an example appearance of a route comparison device (a mobile phone) according to a second embodiment of the present disclosure.
Figure 12:
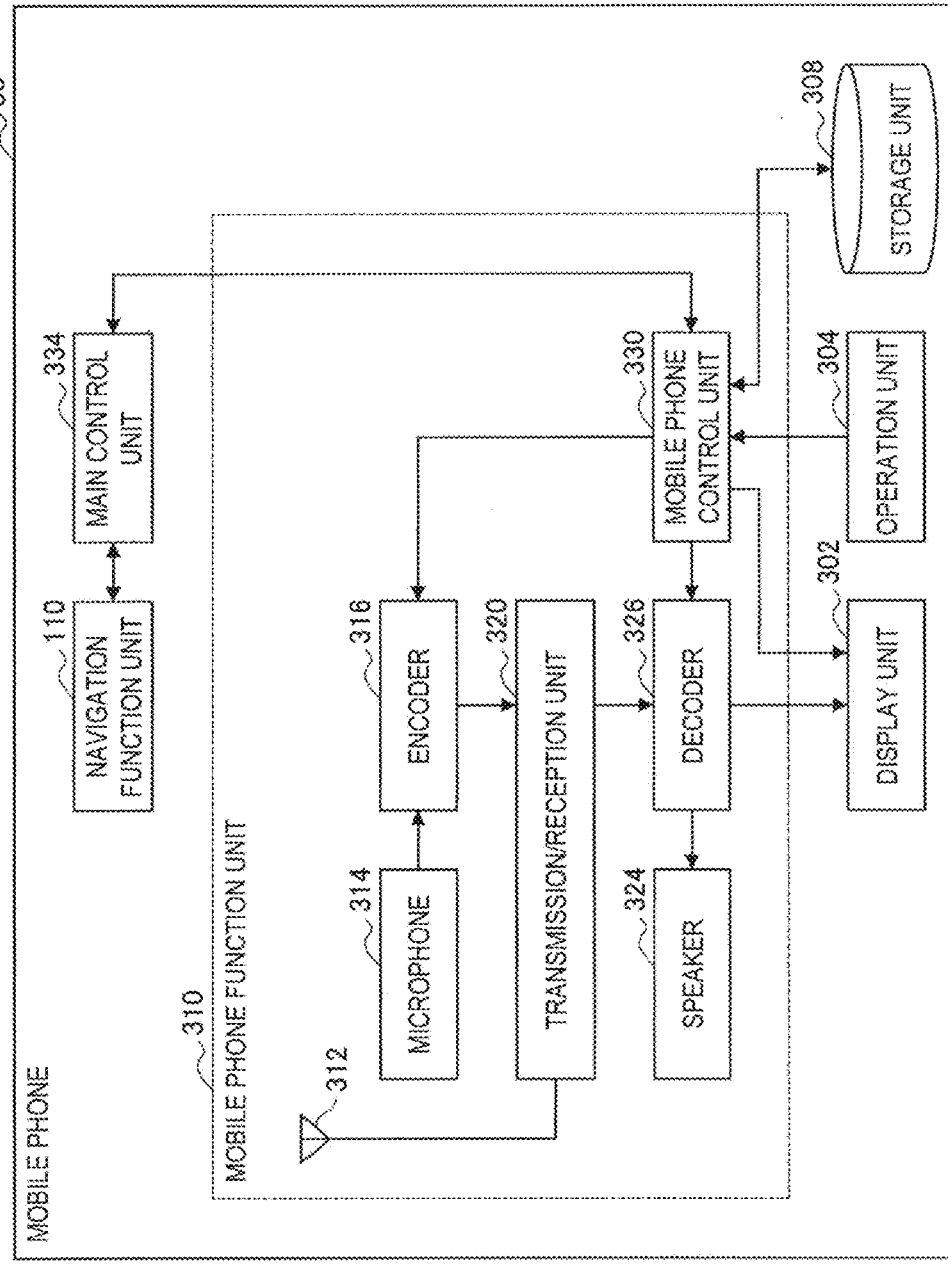
FIG. 12 is a functional block diagram of the route comparison device according to the embodiment.

Next, a mobile phone which is an example of a route comparison device according to a second embodiment of the present disclosure will be described with reference to FIGS. 11 and 12. FIG. 11 is an example appearance of the route comparison device (a mobile phone) according to the second embodiment of the present disclosure. FIG. 12 is a functional block diagram of the route comparison device according to the embodiment.

A mobile phone 30 shown in FIG. 11 is an example of the route comparison device, and mainly includes a display unit 302, an operation unit 304, and a speaker 324. Furthermore, like the PND 10, the mobile phone 30 may be attached to a vehicle by a cradle 303. Or, the mobile phone 30 may be attached to a bicycle using any other accessory for attaching the mobile phone 30 to a bicycle.

As shown in FIG. 12, the mobile phone 30 mainly includes a navigation function unit 110, a display unit 302, an operation unit 304, a storage unit 308, a mobile phone function unit 310, and a main control unit 334.

The mobile phone function unit 310 is connected to the display unit 302, the operation unit 304, and the storage unit 308. Incidentally, although the illustration is simplified in FIG. 12, the display unit 302, the operation unit 304, and the storage unit 308 are connected also to the navigation function unit 110. Additionally, the detailed configuration of the navigation function unit 110 has been described with reference to FIGS. 2 and 4, and thus the explanation will be omitted here. Moreover, parts in the description of FIGS. 2 and 4 regarding the "PND 10" will be read here as parts regarding the "mobile phone 30".

The mobile phone function unit 310 is a component for realizing a communication function, an email function, and the like, and mainly includes a communication antenna 312, a microphone 314, an encoder 316, a transmission/reception unit 320, a speaker 324, a decoder 326, and a mobile phone control unit 330.

The microphone 314 collects sound, and outputs it as an audio signal. The encoder 316 can perform digital conversion, encoding or the like on the audio signal input from the microphone 314, under the control of the mobile phone control unit 330, and output audio data to the transmission/reception unit 320.

The transmission/reception unit 320 modulates the audio data input from the encoder 316 according to a predetermined method, and wirelessly transmits the same from the communication antenna 312 to a base station of the mobile phone 30. Also, the transmission/reception unit 320 can acquire the audio data by demodulating the wireless signal by the communication antenna 312, and output the same to the decoder 326.

The decoder 326 can perform decoding, analogue conversion or the like on the audio data input from the transmission/reception unit 320, under the control of the mobile phone control unit 330, and output the audio signal to the speaker 324. The speaker 324 can output sound based on the audio signal supplied from the decoder 326.

Furthermore, in the case of receiving an email, the mobile phone control unit 330 supplies received data to the decoder 326 from the transmission/reception unit 320, and causes the decoder 326 to decode the received data. Then, the mobile phone control unit 330 can output email data obtained by decoding to the display unit 302 and cause the display unit 302 to display the same, and also, store the email data in the storage unit 308.

Furthermore, in the case of transmitting an email, the mobile phone control unit 330 causes the encoder 316 to encode email data input via the operation unit 304, and wirelessly transmits the same to the transmission/reception unit 320 and the communication antenna 312.

The main control unit 334 controls the mobile phone function unit 310 and the navigation function unit 110 described above. For example, in the case there is a phone call while executing a navigation function of the navigation function unit 110, the main control unit 334 may temporarily switch the navigation function to a communication function of the mobile phone function unit 310, and cause the navigation function unit 110 to restart the navigation function when the phone call is over.

Also with the mobile phone 30 configured as above, the function of the route comparison device can be achieved by the control unit 150 having the configuration shown in FIG. 4.

In the foregoing, examples of functions of the mobile phone 30, which is an example of the route comparison device according to the present embodiment, have been described. Each of the structural elements described above may be configured using a general-purpose component or circuit, or may be configured by hardware dedicated to the function of each structural element. Also, the function of each structural element may be performed by an arithmetic device such as a CPU (Central Processing Unit) reading control program describing the processing procedure for realizing the function from a storage medium such as a ROM (Read Only Memory) or a RAM (Random Access Memory) storing the control program, and interpreting and executing the program. Accordingly, the configuration to be used can be changed as appropriate according to the technical level at the time of carrying out the present embodiment. For example, functions of the mobile phone 30 according to the example described above may be partially omitted, or new functions may be added, according to the embodiment.

Additionally, a computer program for realizing each function of the route comparison device according to the present embodiment as described above can be created and installed on a personal computer or the like. Also, a computer-readable recording medium storing the computer program can be provided. The recording medium is, for example, a magnetic disk, an optical disk, a magneto-optical disk, a flash memory, or the like. Furthermore, the computer program described above may be delivered over a network without using the recording medium, for example.

Additionally, the PND 10 described in the first embodiment and the mobile phone 30 described in the second embodiment are devices that themselves include the navigation function and the route comparison function. However, it is needless to say that these functions can be implemented by distributed processing according to cloud technology, for example. For example, a configuration is possible where the route comparison function is realized by the distributed processing according to the cloud technology, shape data of a found route generated by the PND 10 or the mobile phone 30 is uploaded, and the PND 10 or the mobile phone 30 receives the degree of matching calculated by the route comparison function on the cloud. Furthermore, the navigation function itself can be realized by the distributed processing according to the cloud technology. At this time, the PND 10 or the mobile phone 30 can control the display screen of the PND 10 or the mobile phone 30 based on the navigation function and the route comparison function on the cloud.

3. Third Embodiment

Next, a reference route generation device that generates a reference route by using the function of the route comparison device for calculating the degree of matching will be described. Here, an explanation will be given on the reference route generation device that takes a route that is most often selected as the reference route.

(3-1. Overview)

Figure 13:
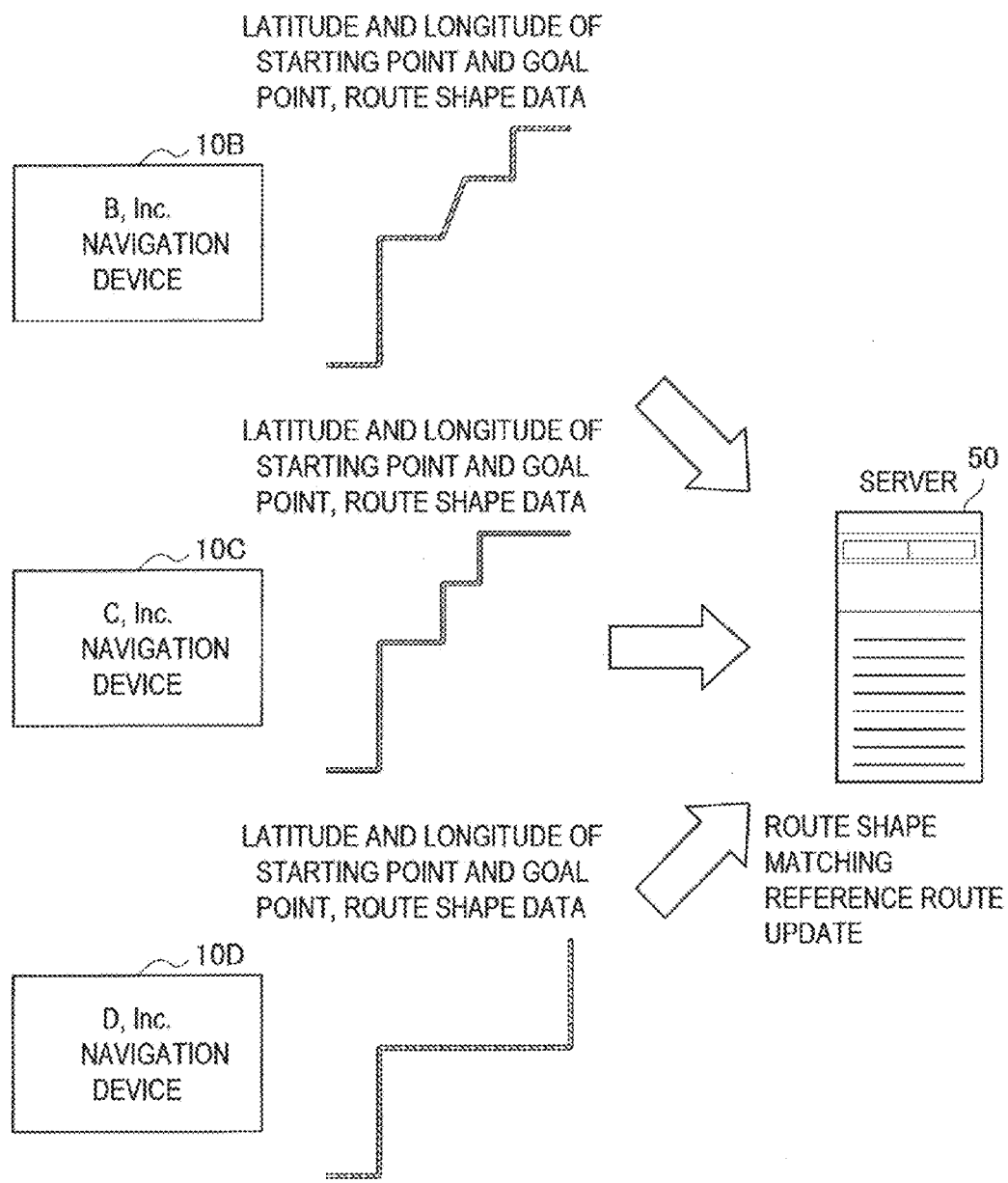
FIG. 13 is an explanatory diagram regarding an overview of a route comparison device (a reference route generation device) according to a third embodiment of the present disclosure.

First, an overview of a reference route generation device 50 according to the present embodiment will be given with reference to FIG. 13. FIG. 13 is an explanatory diagram regarding an overview of a route comparison device (a reference route generation device) according to the third embodiment of the present disclosure.

The reference route generation device 50 can collect, from a plurality of devices that have a function of generating a route, such as the navigation device 10, location information (for example, a latitude and a longitude) of a starting point and a goal point and shape data of a route between the starting point and the goal point. Then, the reference route generation device 50 can generate a reference route based on these pieces of shape data. At this time, the reference route generation device 50 can determine whether two routes indicate the same route by calculating the degree of matching of the two routes based on the pieces of shape data of the two routes. The reference route generation device 50 can take, as the reference route, a route that is most collected among a plurality of routes collected with respect to certain starting point and goal point. A configuration of the reference route generation device 50 for realizing the function will be described next.

(3-2. Configuration)

Figure 14:
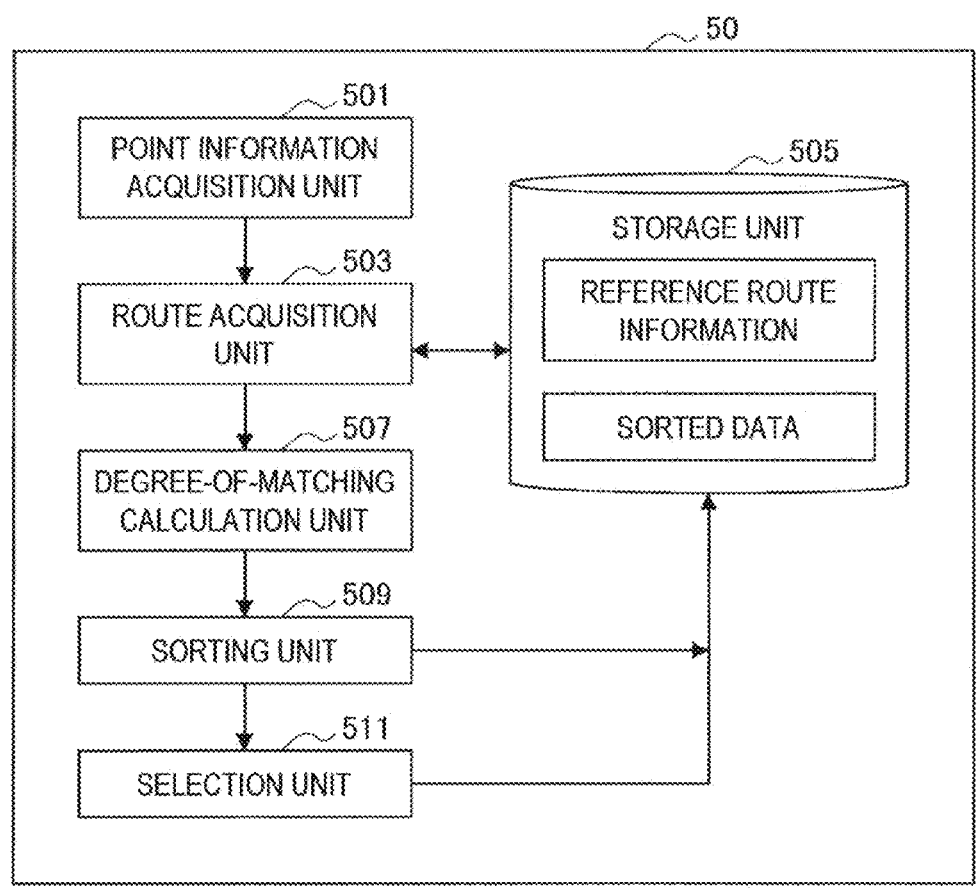
FIG. 14 is a functional block diagram of the route comparison device according to the embodiment.

A configuration of the reference route generation device 50 according to the present embodiment will be described with reference to FIGS. 14 and 15. FIG. 14 is a functional block diagram of the route comparison device according to the embodiment. FIG. 15 is an explanatory diagram showing an example of sorted data used in the embodiment.

Referring to FIG. 14, the reference route generation device 50 mainly includes a point information acquisition unit 501, a route acquisition unit 503, a storage unit 505, a degree-of-matching calculation unit 507, a sorting unit 509, and a selection unit 511.

The point information acquisition unit 501 has a function of acquiring location information of a starting point and a goal point. The point information acquisition unit 501 can acquire information of a starting point and a goal point from information of a route that is a standard, for example.

The route acquisition unit 503 can acquire shape data of two routes between the starting point and the goal point acquired by the point information acquisition unit 501. For example, the route acquisition unit 503 may repeatedly select two routes from pieces of shape data of a plurality of routes and acquire the shape data of the two routes.

The storage unit 505 is a storage medium storing a program for causing the reference route generation device 50 to operate, and various pieces of data. This storage unit 505 may be, for example, a non-volatile memory, such as a flash ROM (or a flash memory), an electrically erasable programmable read-only memory (EEPROM), an erasable programmable ROM (EPROM) or the like, a magnetic disk, such as a hard disk, a discoid magnetic disk or the like, an optical disk, such as a compact disc (CD), a digital versatile disc recordable (DVD-R), a Blu-Ray disc (registered trademark) or the like, or a magneto optical (MO) disk.

In the present embodiment, the storage unit 505 can store shape data of a plurality of routes, for example. Also, the storage unit 505 can store sorted data in which a plurality of routes are sorted, for example. Furthermore, the storage unit 505 can also store information about a reference route selected after sorting. FIG. 15 shows an example of this sorted data. Sorted data 52 shown here may include point information, which is the location information of a starting point and a goal point, shape data, and the number of counts. The point information may include the latitude and longitude of a starting point and the latitude and longitude of a goal point, for example. In FIG. 15, the point information is described in the form of "(latitude of starting point, longitude of starting point)—(latitude of goal point, longitude of goal point)".

The degree-of-matching calculation unit 507 has a function of calculating the degree of matching indicating the degree of correspondence between two routes. For example, the degree-of-matching calculation unit 507 can calculate the degree of matching using shape data of two routes acquired by the route acquisition unit 503. The details of this calculation of the degree of matching have been given in the first embodiment, and will be omitted here.

The sorting unit 509 has a function of determining, based on the value of the degree of matching, whether two routes, for which the degree of matching has been calculated, are the same route or not, and of sorting a plurality of routes. This sorted result may be stored as sorted data, as has been described using FIG. 15. Specifically, the sorting unit 509 sorts each route based on the value of the degree of matching. Then, the sorting unit 509 counts the number of routes sorted into each route. For example, in the case routes to be sorted are pieces of information of routes actually selected by a plurality of users, the number of counts is the number of times each route has been selected by the user.

The selection unit 511 has a function of selecting a reference route based on the sorting result of the sorting unit 509. For example, the selection unit 511 can take a route with the largest number of counts as the reference route.

In the foregoing, examples of functions of the reference route generation device 50, which is an example of the route comparison device according to the present embodiment, have been described. Each of the structural elements described above may be configured using a general-purpose component or circuit, or may be configured by hardware dedicated to the function of each structural element. Also, the function of each structural element may be performed by an arithmetic device such as a CPU (Central Processing Unit) reading control program describing the processing procedure for realizing the function from a storage medium such as a ROM (Read Only Memory) or a RAM (Random Access Memory) storing the control program, and interpreting and executing the program. Accordingly, the configuration to be used can be changed as appropriate according to the technical level at the time of carrying out the present embodiment.

Additionally, a computer program for realizing each function of the reference route generation device 50 according to the present embodiment as described above can be created and installed on a personal computer or the like. Also, a computer-readable recording medium storing the computer program can be provided. The recording medium is, for example, a magnetic disk, an optical disk, a magneto-optical disk, a flash memory, or the like. Furthermore, the computer program described above may be delivered over a network without using the recording medium, for example.

According to the reference route generation device 50 described here, a route that is selected the most can be taken as the reference route, by collecting and sorting actual travel records of a plurality of users, for example. At this time, sorting of routes is performed based on the degree of matching that is calculated by pattern matching using shape data of routes. Thus, even if the data structures of respective routes are different or even if values indicating the same link differ due to the manufacturers of devices for generating routes being different, routes can be sorted by comparatively accurately determining whether pieces of information are of the same route or not.

It should be understood by those skilled in the art that various modifications, combinations, sub-combinations and alterations may occur depending on design requirements and other factors insofar as they are within the scope of the appended claims or the equivalents thereof.

For example, in the embodiments described above, explanations have been given, in the first and second embodiments, using example applications to a terminal device of a user as examples of the route comparison device. Specifically, a PND has been cited as the example in the first embodiment, and a mobile phone has been cited as the example in the second embodiment. However, the present technology is not limited to these examples. For example, the present technology can be applied to any information processing apparatus such as a portable game console, a portable music playback device, a portable video playback device, and the like. Also, in the third embodiment, a case of realizing functions of the route comparison device on a server has been described. However, it is apparent that, as well as a case where these functions are realized by one server, an embodiment of realizing these functions by a plurality of devices according to distributed processing is also within the technical scope of the present disclosure.

Furthermore, in the embodiments described above, explanations have been given in the first and second embodiments regarding a terminal device that compares a found route and a reference route, and an explanation has been given in the third embodiment regarding a server device that compares two routes without taking into account which generators have generated the routes. However, the present technology is not limited to such an example. For example, the route comparison device can also be implemented as a server device that compares a found route and a reference route. Also, the route comparison device can be implemented as a terminal device that compares two routes without using a reference route. Furthermore, in the case of implementing the present technology on a server, a configuration is possible where a terminal device having a navigation function is connected to a cloud service for realizing a route comparison function, for example. Or, in the case of implementing the present technology on a server, a configuration is possible where a terminal device such as a mobile phone, for example, is connected to a cloud service having a route comparison function and a navigation function, for example.

Furthermore, a navigation device having an absolute positioning function by a GPS and a relative positioning function of a sensor has been described in the embodiment described above, but the present technology is not limited to such an example. For example, a navigation device may include a location information acquisition unit having a receiver for receiving WiFi waves from a plurality of base stations and a current location calculation unit for estimating the distance from each base station based on a reception intensity of the WiFi wave and calculating the current location based on the principle of triangulation by using the distance from each base station and the location of each base station. Furthermore, a GPS has been cited as an example of a navigation satellite, but the navigation satellite is, of course, not limited to the GPS. The navigation satellite may be various types of navigation satellites such as Galileo, GLONASS, Hokuto, Michibiki, and the like. Here, as the navigation satellite, one type of satellite may be used, or a combination of navigation signals of a plurality of types of satellites may be used. The configuration used for location information acquisition may be changed as appropriate according to the technical level at the time of implementation.

Furthermore, in the embodiment described above, it is assumed that orbital data of a GPS satellite is included in a GPS signal, but the present technology is not limited to such an example. For example, the orbital data of a GPS satellite may be acquired from an external server. Or, it may be stored in advance in the storage unit 102.

Furthermore, in the embodiments described above, explanations have been given with respect to a route of a user travelling mainly by a car, on a bicycle or on foot. However, the present disclosure is not limited to such an example. For example, the present technology can also be applied to travel routes of air planes and ships.

Additionally, the steps described in the flow charts in the present specification include, of course, processes performed chronologically according to the order described, and also processes that are performed in parallel or individually without being performed chronologically. Also, it is needless to say that the order may be changed as appropriate for steps that are chronologically processed.

Additionally, the following configurations are also within the scope of the present disclosure.

(1)

A route comparison device including:

a point information acquisition unit for acquiring location information of a starting point and a goal point;

a reference route acquisition unit for acquiring shape data of a reference route between the starting point and the goal point;

a route search unit for searching for a route between the starting point and the goal point; and a degree-of-matching calculation unit for calculating, by comparing shape data of a found route which has been found by the route search unit and the shape data of the reference route, a degree of matching indicating a degree of correspondence between the routes.

(2)

The route comparison device according to (1), wherein the degree-of-matching calculation unit calculates the degree of matching based on an area of a portion where the shape data of the reference route and the shape data of the found route overlap.

(3)

The route comparison device according to (2), wherein the degree-of-matching calculation unit calculates the degree of matching by using the shape data of the found route whose shape has been obscured.

(4)

The route comparison device according to (3), wherein the degree-of-matching calculation unit obtains the area by using the shape data in which the shape has been obscured by broadening a line width of the found route to be same as a line width of the shape data of the reference route.

(5)

The route comparison device according to (3) or (4), wherein the degree-of-matching calculation unit obtains the area by using the shape data in which the shape has been obscured by performing a rounding process on a joint between links of the found route.

(6)

The route comparison device according to any of (1) to (5), further including:

a display control unit for causing to be displayed a display screen where the degree of matching calculated by the degree-of-matching calculation unit is superimposed on a map together with the found route.

(7)

The route comparison device according to (6), wherein the display control unit causes to be displayed the display screen where the reference route is further superimposed on the map.

(8)

The route comparison device according to any of (1) to (7), wherein the route search unit searches for a plurality of routes between the starting point and the goal point, and wherein the degree-of-matching calculation unit calculates the degree of matching to the reference route for a plurality of the found routes.

(9)

The route comparison device according to any of (1) to (8), wherein the reference route is a route generated based on routes found by a plurality of route search devices.

(10)

The route comparison device according to any of (1) to (9), wherein the reference route is a route generated based on routes that a plurality of users have actually traveled.

(11)

The route comparison device according to any of (1) to (10), wherein the reference route is a route which is determined by matching using pieces of shape data of a plurality of routes to have been adopted most often.

(12)

A route comparison device including:

a point information acquisition unit for acquiring location information of a starting point and a goal point;

a route acquisition unit for acquiring shape data of two routes between the starting point and the goal point; and a degree-of-matching calculation unit for calculating, by comparing the shape data of the two routes acquired by the route acquisition unit, a degree of matching indicating a degree of correspondence between the two routes.

(13)

The route comparison device according to (12), wherein the route acquisition unit repeatedly selects two routes from shape data of a plurality of routes, and acquires shape data of the two routes, and wherein the route comparison device further includes a sorting unit for determining, based on the degree of matching, whether the two routes for which the degree of matching has been calculated are a same route or not, and sorting the plurality of routes.

(14)

The route comparison device according to (13), further including:

a selection unit for selecting a reference route based on a sorting result of the sorting unit.

(15)

A route comparison method including:

acquiring location information of a starting point and a goal point;

acquiring shape data of a reference route between the starting point and the goal point;

searching for a route between the starting point and the goal point; and calculating, by comparing shape data of a found route which has been found and the shape data of the reference route, a degree of matching indicating a degree of correspondence between the routes.

(16)

A program for causing a computer to function as a route comparison device including:

a point information acquisition unit for acquiring location information of a starting point and a goal point;

a reference route acquisition unit for acquiring shape data of a reference route between the starting point and the goal point;

a route search unit for searching for a route between the starting point and the goal point; and a degree-of-matching calculation unit for calculating, by comparing shape data of a found route which has been found by the route search unit and the shape data of the reference route, a degree of matching indicating a degree of correspondence between the routes.

The present application contains subject matter related to that disclosed in Japanese Priority Patent Application JP 2011-136511 filed in the Japan Patent Office on Jun. 20, 2011, the entire content of which is hereby incorporated by reference.

What is claimed is:

1. A route comparison device comprising:
circuitry configured to:
acquire location information of a starting point and a goal point;
acquire shape data of a reference route between the starting point and the goal point;

search for a route between the starting point and the goal point; and calculate, by comparing shape data of a found route which has been found and the shape data of the reference route, a degree of matching indicating a degree of correspondence between the routes.

2. The route comparison device according to claim 1, wherein the circuitry is further configured to search for a plurality of routes between the starting point and the goal point, and calculate the degree of matching to the reference route for a plurality of the found routes.

3. The route comparison device according to claim 1, wherein the reference route is a route generated based on routes found by a plurality of route search devices.

4. The route comparison device according to claim 1, wherein the reference route is a route generated based on routes that a plurality of users have actually traveled.

5. The route comparison device according to claim 1, wherein the reference route is a route which is determined by matching using pieces of shape data of a plurality of routes to have been adopted most often.

6. The route comparison device according to claim 1, wherein the circuitry is configured to calculate the degree of matching based on an area of a portion where the shape data of the reference route and the shape data of the found route overlap.

7. The route comparison device according to claim 6, wherein the circuitry is configured to calculate the degree of matching by using the shape data of the found route whose shape has been obscured.

8. The route comparison device according to claim 7, wherein the circuitry is configured to obtain the area by using the shape data in which the shape has been obscured by broadening a line width of the found route to be same as a line width of the shape data of the reference route.

9. The route comparison device according to claim 7, wherein the circuitry is configured to obtain the area by using the shape data in which the shape has been obscured by performing a rounding process on a joint between links of the found route.

10. The route comparison device according to claim 1, wherein the circuitry is further configured to cause to be displayed a display screen where the degree of matching is superimposed on a map together with the found route.

11. The route comparison device according to claim 2, wherein the circuitry is further configured to cause to be displayed the display screen where the reference route is further superimposed on the map.

12. A route comparison device comprising:
circuitry configured to:
acquire location information of a starting point and a goal point;
acquire shape data of two routes between the starting point and the goal point; and
calculate, by comparing the shape data of the two acquired routes, a degree of matching indicating a degree of correspondence between the two routes.

13. The route comparison device according to claim 12, wherein the circuitry is further configured to repeatedly select two routes from shape data of a plurality of routes, and acquire shape data of the two routes, and
wherein the circuitry is further configured to determine, based on the degree of matching, whether the two routes for which the degree of matching has been calculated are a same route or not, and sorting the plurality of routes.

14. The route comparison device according to claim 13, further comprising:
wherein the circuitry is further configured to select reference route based on a sorting result.

15. A route comparison method comprising:
acquiring location information of a starting point and a goal point;
acquiring shape data of a reference route between the starting point and the goal point;
searching for a route between the starting point and the goal point; and
calculating via a processor, by comparing shape data of a found route which has been found and the shape data of the reference route, a degree of matching indicating a degree of correspondence between the routes.

16. A non-transitory computer-readable medium storing computer readable instructions thereon that when executed by computer cause the computer to perform a method comprising:
acquiring location information of a starting point and a goal point;
acquiring shape data of a reference route between the starting point and the goal point;
searching for a route between the starting point and the goal point; and
calculating, by comparing shape data of a found route which has been found and the shape data of the reference route, a degree of matching indicating a degree of correspondence between the routes.

* * * * *